United States Patent
Uliyar et al.

(10) Patent No.: US 10,529,083 B2
(45) Date of Patent: Jan. 7, 2020

(54) METHODS AND SYSTEMS FOR ESTIMATING DISTANCE OF AN OBJECT FROM A MOVING VEHICLE

(71) Applicant: Lighmetrics Technologies Pvt. Ltd., Bangalore (IN)

(72) Inventors: Mithun Uliyar, Bangalore (IN); Ravi Shenoy, Bangalore (IN); Soumik Ukil, Bangalore (IN); Krishna A G, Bangalore (IN); Gururaj Putraya, Bangalore (IN); Pushkar Patwardhan, Bangalore (IN)

(73) Assignee: Lighmetrics Technologies Pvt. Ltd., Bangalore (IN)

( * ) Notice: Subject to any disclaimer, the term of this patent is extended or adjusted under 35 U.S.C. 154(b) by 201 days.

(21) Appl. No.: 15/833,482

(22) Filed: Dec. 6, 2017

(65) Prior Publication Data
US 2018/0165822 A1    Jun. 14, 2018

(30) Foreign Application Priority Data
Dec. 8, 2016  (IN) .............................. 201641041933

(51) Int. Cl.
*G06K 9/00* (2006.01)
*G06T 7/55* (2017.01)
(Continued)

(52) U.S. Cl.
CPC ............ *G06T 7/55* (2017.01); *G06K 9/00798* (2013.01); *G06K 9/00805* (2013.01);
(Continued)

(58) Field of Classification Search
CPC ......... G06K 2009/363; G06K 9/00798; G06K 9/00805; G06K 9/00818; G06K 9/36; G06T 2207/10016; G06T 2207/10024; G06T 2207/10032; G06T 2207/30244; G06T 2207/30256; G06T 2207/30261;
(Continued)

(56) References Cited

U.S. PATENT DOCUMENTS 6,477,260 B1 *  11/2002  Shimomura ......... H04N 13/239
                                                382/106
6,757,328 B1 *   6/2004  Huang ..................... G08G 1/04
                                                375/240.1

(Continued)

*Primary Examiner* — Tom Y Lu
(74) *Attorney, Agent, or Firm* — North Shore Patents, P.C.; Michele Liu Baillie

(57) ABSTRACT

A method for estimating distance of an object from a moving vehicle is provided. The method includes detecting, by a camera module in one or more image frames, an object on a road on which the vehicle is moving. The method includes electronically determining a pair of lane markings associated with the road. The method further includes electronically determining a lane width between the pair of the lane markings in an image coordinate of the one or more image frames. The lane width is determined at a location of the object on the road. The method includes electronically determininga real world distance of the object from the vehicle based at least on number of pixels corresponding to the lane width in the image coordinate, a pre-defined lane width associated with the road and at least one camera parameter of the camera module.

20 Claims, 8 Drawing Sheets

(51) Int. Cl.
*G06T 7/80* (2017.01)
*G06T 7/536* (2017.01)
*H04N 5/232* (2006.01)
*H04N 7/18* (2006.01)
*G06K 9/36* (2006.01)
*G06T 7/62* (2017.01)

(52) U.S. Cl.
CPC ........... *G06K 9/00818* (2013.01); *G06K 9/36* (2013.01); *G06T 7/536* (2017.01); *G06T 7/62* (2017.01); *G06T 7/80* (2017.01); *H04N 5/23296* (2013.01); *H04N 7/181* (2013.01); *G06K 2009/363* (2013.01); *G06T 2207/10016* (2013.01); *G06T 2207/10024* (2013.01); *G06T 2207/10032* (2013.01); *G06T 2207/30244* (2013.01); *G06T 2207/30256* (2013.01); *G06T 2207/30261* (2013.01)

(58) Field of Classification Search
CPC .. G06T 7/536; G06T 7/55; G06T 7/62; G06T 7/80; H04N 5/23296; H04N 7/181
See application file for complete search history.

(56) References Cited

U.S. PATENT DOCUMENTS

| | | | |
|---|---|---|---|
| 2006/0013439 A1* | 1/2006 | Takeda | G01C 11/06 382/103 |
| 2010/0321490 A1* | 12/2010 | Chen | G01C 11/00 348/118 |
| 2015/0169956 A1* | 6/2015 | You | G06K 9/00624 382/103 |
| 2018/0046867 A1* | 2/2018 | Yang | B60R 1/00 |

* cited by examiner

METHODS AND SYSTEMS FOR ESTIMATING DISTANCE OF AN OBJECT FROM A MOVING VEHICLE

CROSS-REFERENCE TO RELATED APPLICATIONS

This application claims the benefit of the earlier filing date of Indian Provisional Patent Application No. 201641041933 filed on Dec. 8, 2016, which is incorporated by reference herein in its entirety.

TECHNICAL FIELD

Embodiments of the disclosure relate generally to the field of computer vision algorithms and, more particularly, to methods and systems for detecting objects in an automotive environment, measuring the distance of such objects from a moving vehicle and determining other driving related information.

BACKGROUND

In an automotive environment, there is never an instance where a vehicle does not come across obstacles on the roads. Objects such as other vehicles, pedestrians, objects lying on the road surface, animals, potholes etc., pose as obstacles to a vehicle. The driver of a vehicle needs to maintain extreme care in avoiding collision with such objects to prevent, an accident from, occurring. Nowadays, there are a number of automatic driver assistance systems implemented in the vehicles that provide assistance to the drivers while driving, thereby avoiding accidents on roads and ensuring road safety.

Vehicles nowadays are equipped with Advanced-Driver-Assistance-Systems (ADAS) technology. ADAS provides a safe human-machine interface that alerts the driver to potential problems, or to avoid collisions by implementing safeguards and taking over control of the vehicle. In ADAS, measurement of the distance of objects in the scene from the vehicle is of critical importance, which helps avoid accidents and ensures safe driving.

ADAS and other conventional technologies implement cameras in the vehicle to assist the driver and determine distances to a leading vehicle or another object on the road. Examples of a camera include a stereo camera and single camera, among others. In most systems and methods, the camera determines distances to objects by emitting, a modulated light wave, detecting a corresponding reflected light wave from the object and measuring the shift of the reflected light wave in relation to the emitted light wave. The distance can be calculated because the wavelength and speed of the light are known.

Distance estimation using stereo cameras comes with higher material cost, in addition to an extensive calibration and rectification process. In comparison, single camera based systems are much more prevalent, either through dedicated cameras installed by auto Original Equipment Manufacturer (OEM's), or through standalone dash cameras and smartphone mounted on the dashboard.

It is also important to calculate distance from a vehicle to objects at the front and also at the back. It is further important to calculate distance from a vehicle to objects when lane dimensions are not known. Moreover, a problem with distance estimation can arise when the camera is not mounted orthogonal to the road for the accurate distance measurement.

It is also important to determine the length of a vehicle for multiple use cases such as computing effective braking distance for a vehicle. In case of Vehicle-to-everything (V2X) technology, it, would be useful to localize the position of vehicles in an area. Conventional techniques do not take into consideration measuring the length of the vehicle on which the camera is installed. Also, an efficient method for calculating time to collision is required.

Hence, there is a need for a solution that uses one or more single or monocular cameras to measure the distance to other objects, length of the vehicle where the camera is mounted and a time to collision accurately in real-time, among other things, in a cost effective and accurate manner.

SUMMARY

Various embodiments of the present disclosure provide systems and methods for estimating distance of one or more objects from a moving vehicle and determining driving related information using the distance estimation.

An embodiment provides a method for estimating distance of an object from a moving vehicle. The method includes detecting, by a camera module in one or more image frames, an object on a road on which the vehicle is moving. The method includes electronically determining a pair of lane markings associated with the road on which the vehicle is moving. The method further includes electronically determining a lane width between the pair of the lane markings in image coordinates of the one or more image frames. The lane width is determined at a location of the object on the road. The method further includes electronically determining a real-world distance of the object from the vehicle based at least on number of pixels corresponding to the lane width in the image coordinate, a pre-defined lane width and at least one camera parameter of the camera module.

Another embodiment provides a system for estimating distance of an object from a moving vehicle. The system includes a camera module, a memory and a processor. The camera module is configured to capture one or more image frames corresponding to a road on which a vehicle is moving. The memory stores the one or more image frames corresponding to the road and information corresponding to a dimension of the road on which the vehicle is moving. The memory further stores instructions. The processor executes the instructions on the one or more image, frames and causes the system to detect an object on the road on which the vehicle is moving in the one or more image frames. Further, the system is caused to determine a pair of lane markings associated with the road. The system is further caused to determine a lane width between the pair of lane markings in an image coordinate of the one or more image frames, where the lane width is determined at a location of the object on the road. The system is further caused to determine a real-world distance of the object from the vehicle based at, least on a number of pixels corresponding to the lane width in the image coordinate, a pre-defined lane width and at least one camera parameter of the camera module.

BRIEF DESCRIPTION OF THE FIGURES

For a more complete understanding of example embodiments of the present technology reference is now made to the following descriptions taken in connection with the accompanying drawings in which.

Figure 1:
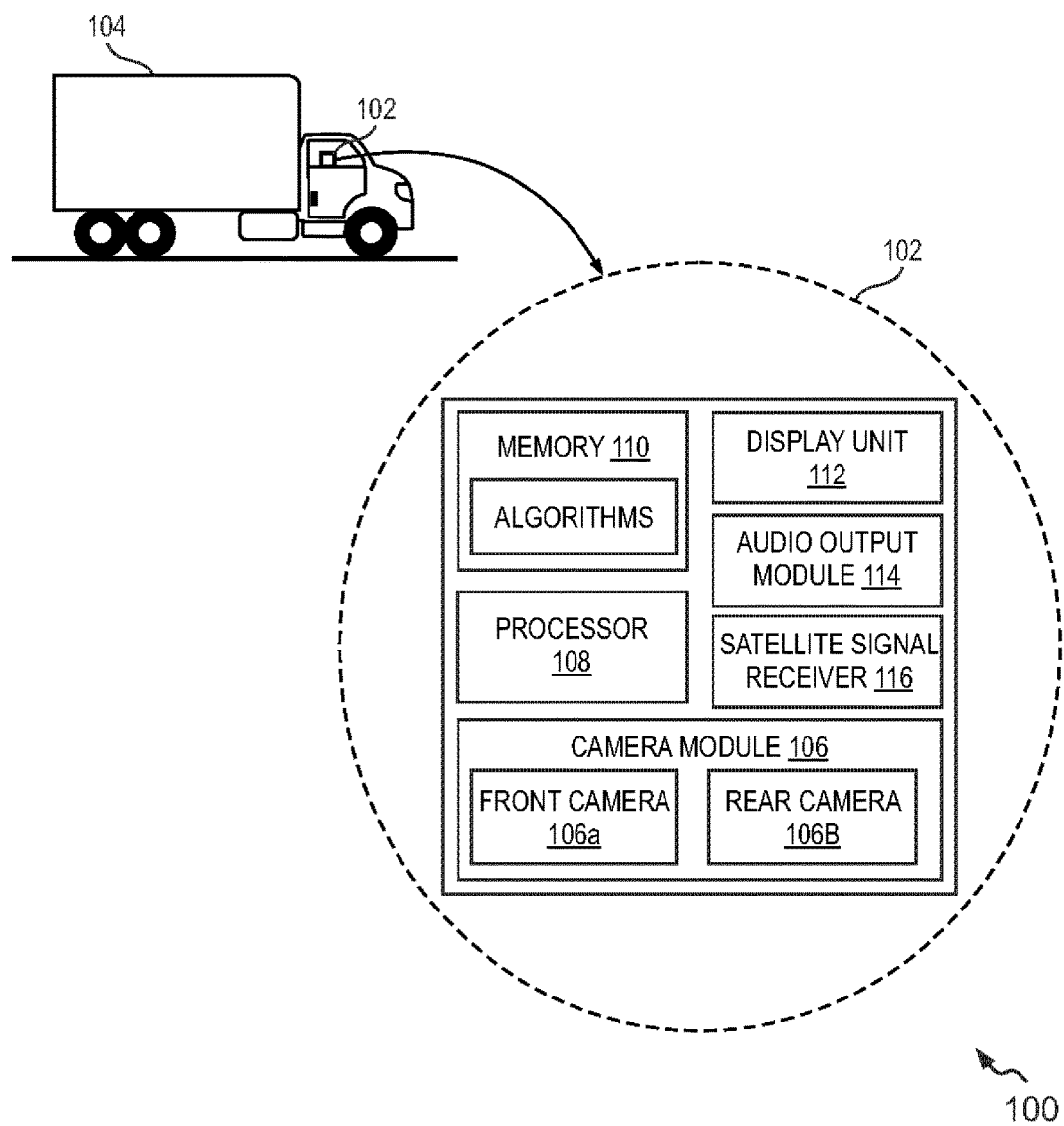
FIG. 1 is a block diagram of a system for estimating distance of an object from a vehicle, related to at least some embodiments.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and, methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods and systems for estimating distance of an object from a moving vehicle.

Embodiments provide a system comprising a camera module. The camera module includes one or more monocular cameras, such as a front camera and a rear camera, a processor and a memory. The camera module may also include a display unit, an audio output module and GPS receivers. The system is configured as an on-board device in a vehicle. The system may be available as a single module or as multiple components disposed at different locations within the vehicle and each component connected by means of cables, wires or through wireless connection. The front and the rear cameras are monocular cameras. The front and the rear cameras capture the scene at the front and at the back of the vehicle in multiple image frames. The multiple image frames are stored at the memory. The camera module detects a pair of lane markings associated with a road on which the vehicle is moving and determines a lane width between the pair of lane markings. The lane width is expressed in pixels in the image coordinates of the one or more image frames. A predefined mapping/relationship between the lane width in pixels and the fixed lane width in real-world dimensions is derived and used for the estimation of distance to an object from the moving vehicle.

In some embodiments, the system is configured to mark or define a pair of virtual lane markings in the multiple image frames and thereby determine a lane width in scenarios where the lane markings are not available. In such scenarios, at least one predefined object on the road is used for defining the virtual lane markings to compute the lane width. The predefined object on the lane can take example of any known object that has fixed dimensions. Examples of the predefined object may be a sign object such as a STOP sign, a traffic light, a speed limit sign, milestones, or any hoardings, streetlights, etc.

The system further calculates a time to collision (TTC) with a vehicle at the back and a safe braking distance for a vehicle at the front. Upon determining TTC, notification is sent to a driver of the vehicle alerting the driver to take necessary action such as maintain a safe braking distance. In an embodiment, the system is also configured to determine the length of the vehicle based on distance estimation. The system also determines if the vehicle has complied with a yield sign and thereby alerts the driver of the vehicle if the vehicle has violated a yield sign.

FIG. 1 is a representation of an automotive environment 100 where a composite system 102 for estimating distance of an object or a vehicle from a moving vehicle such as a vehicle 104 is deployed. The composite system 102 is deployed in an example automotive environment 100 illustrated in FIG. 1 and is used for description purposes with reference to FIGS. 2-10. The composite system 102 is configured as an on-board device in the vehicle 104. As shown in FIG. 1, the composite system 102 includes a camera module 106 which includes a front camera 106a and a rear camera 106b. The composite system 102 includes a processor 108, a memory 110, a display unit 112. The composite system 102 can also optionally include an audio output module 114. The composite system 102 may additionally include a satellite signal receiver 116 such as including but not limited to Global Positioning System (GPS) receiver for providing location information to the vehicle 104. The composite system 102 can be deployed within and/or upon the vehicle 104. The vehicle 104 on which the composite system 102 is disposed may also be referred to as current vehicle in some embodiments of the disclosure. The composite system 102 is also referred to as a system 102 in this disclosure.

The composite system 102 includes one or more in-vehicle units and one or more auxiliary location units. The in-vehicle units, as an example, may include the processor 108, the memory 110, the display unit 112, the audio output module 114 and the satellite signal receiver 116. The auxiliary location units include the front and the rear cameras 106a and 106b. The auxiliary location units may be a single computing module comprising one or more components integrated within the module. The in-vehicle units may be appropriately deployed inside the vehicle 104. In some alternate embodiments, the in-vehicle units may also be configured in form of multiple components disposed at different locations within the vehicle 104 and each component may be connected by means of cables, wires or through wireless connection.

Examples of the front and the rear cameras 106a and 106b include monocular cameras or single cameras. The front and the rear cameras 106a and 106b can be appropriately placed at locations including, but not limited to, the roof, back of the rear-view mirrors, bonnet (hood) of the vehicle 104, the trunk, the license plate, etc., of the vehicle 104.

In an example embodiment, the front camera 106a captures the scene in front of the vehicle 104 and identifies obstacles, such as, any object or other vehicle in the direction of motion of the vehicle 104. Preferable locations of the vehicle 104 for mounting the front camera 106a includes, but not limited to, the roof, back of the rear-view mirrors, bonnet (hood) of the vehicle 104, the license plate at the front of the vehicle 104, etc. Likewise, the rear camera 106b captures the scene at the back of the vehicle 104 and identifies any object or other vehicle approaching the vehicle 104 from behind. Preferable locations of the vehicle 104 for mounting the rear camera 106b includes, but not limited to, the trunk, the license plate at the back of the vehicle 104, etc.

The camera module 106 can continuously capture multiple image frames of the scene at the front and at the back of the vehicle (such as the vehicle 104) on which the camera module 106 is mounted. For instance, if the vehicle 104 is travelling on a lane/road, the camera module 106 captures the lane/road on which the vehicle 104 is moving, in the multiple image frames to identify lane dimensions and to detect the presence of an object/vehicle in front and behind the vehicle 104. Camera parameters such as the focal lengths of the front camera 106a and the rear camera 106b are known.

The memory 110 stores instructions that are executable by the processor 108 to estimate the distance of an object/vehicle from the vehicle 104. The memory 110 of the composite system 102 may store the multiple image frames captured by the front camera 106a and the rear camera 106b mounted on the vehicle 104 and information corresponding to the images. The pixel dimensions in the image coordinates of the multiple image frames are recorded in the memory 110.

The memory 110 of the composite system 102 may also store information corresponding to lane/road widths in various regions in a state or a country as defined by the corresponding authority, such as municipality, etc. For example, lane widths on a national highway are more than the lane widths on residential roads. Further, a relationship or a mapping between the lane dimensions (lane width) in real world dimensions (such as meters) and the lane dimensions (lane width) in image coordinates (such as lane width captured by the camera module 106 expressed in pixels) is stored in the memory 110. As an example, a lane width of 3 meters in real world dimensions may be mapped to a lane width of 60 pixels in the images or videos captured by the camera module 106. The mapping is used to estimate the distance (actual distance in real world dimensions) from the vehicle 104 to an identified object.

The memory 110 further stores information corresponding to known road signs, such as a speed limit sign, a stop sign, a curve ahead sign, a traffic light, milestones and light post, etc., in real world dimensions and in image coordinates and a mapping between the real dimensions and pixels in image coordinates is saved. Information corresponding to known road signs include dimensions and shape of the signboard, length of the stand holding the signboard, etc. Further, the memory 110 stores one or more computer vision algorithms, including but not limited to, Hough transform, homographic transformation, etc.

The display unit 112 and the audio output module 114 are output modules of the composite system 102. The display unit 112 may present a virtual scene of the front and back environment of the vehicle 104 captured by the camera module 106. The display unit 112 may present the lanes in which the vehicle 104 is travelling and virtual lane markings to represent the lane widths. The display unit 112 displays any object or vehicle detected on the lane in which the vehicle 104 is travelling. The display unit 112 may, as an example, be configured with split display including two portions of display, wherein one split or portion may display the scene at the front and another split or portion may display the scene at the back of the vehicle 104. The display unit 112 further displays a distance to an object/vehicle from the vehicle 104 estimated by the processor 108. The audio output module 114 provides a voice feedback to a driver of the vehicle 104, wherein the voice feedback may include an estimated distance of vehicles/objects in front and behind the vehicle 104, a rate of change of velocity of the vehicle 104 and a time to collision (TTC) with vehicles at the front and the back, etc.

The satellite signal receiver 116 may receive signals from a satellite system (not shown). Examples of the satellite system may include GPS, GNSS, Galileo, GLONASS, LORAN, BeiDOU, NAVIC, QZSS and the like. The satellite signal receiver 116 calculates the vehicle's (vehicle 104) geo-location based on signals exchanged from the satellite system.

The processor 108 is configured to execute the algorithms stored in the memory 110 in the image frames captured by the camera module 106. The processor 108 determines the mapping/relationship between lane width in image coordinates (such as pixels) and the lane width in real-world dimensions (such as meters). Upon detection of an anomalous object or other vehicle on the lane in the front or behind the vehicle 104, the processor 108 estimates the distance from a location, such as a bottom edge or a center of the bottom edge of anomalous object or the other vehicle to the vehicle 104 based at least on a number of pixels corresponding to the lane width in the image coordinate, a pre-defined lane width and at least one camera, parameter (e.g. focal length) of the camera module 106. The processor 108 detects presence of an object on the lane by determining a spatial discontinuity of a surface of the lane. The processor 108 can define/mark virtual lane markings in the one or more image frames of the lane captured by the camera module 106 when lane widths are not available and cannot be detected by the camera module 106. The terms "lane" and "road" are interchangeably used throughout the disclosure.

The processor 108 further calculates a TTC of a vehicle/object at the back of the vehicle 104 using the distance of the vehicle/object from the vehicle 104 and the velocity of the vehicle 104. The processor sends notification to a driver of the vehicle 104 based on the TTC, where the notification can include providing the safe braking distance and alerting the driver to take necessary action. The processor 108 further determines the length of the vehicle 104. The processor 108 also determines if the vehicle 104 has complied with a yield sign or not, when the vehicle 104 joins a main road from a side road. The processor 108 further determines the TTC of the vehicle 104 with another vehicle at front using a vanishing point method, described later.

The following description elaborates various embodiments of the present disclosure for estimating the distance of an object or any other vehicles from the vehicle 104 in reference with the FIGS. 2-5.

Figure 2:
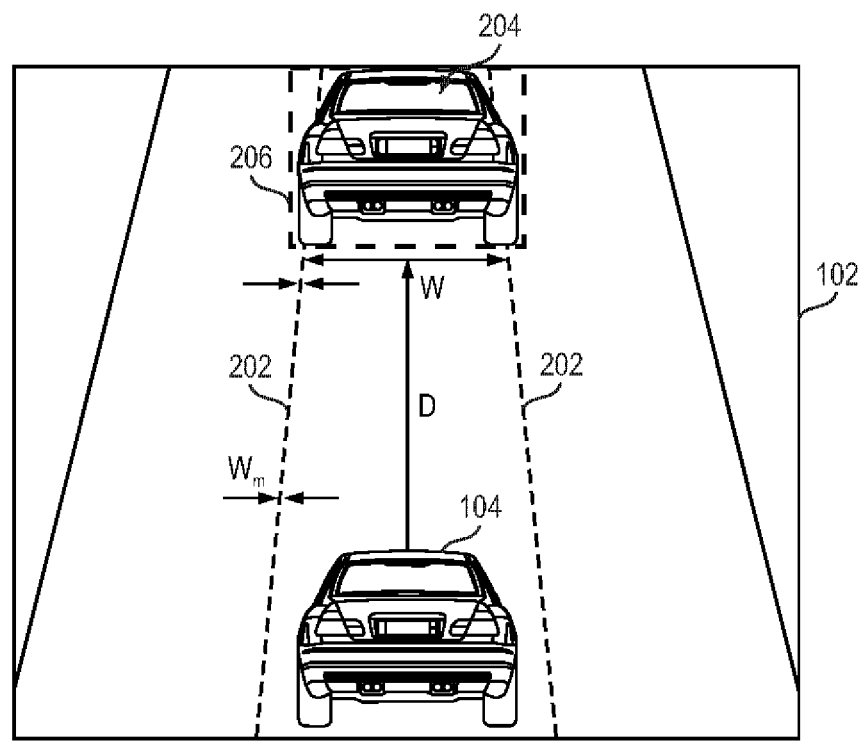
FIG. 2 is a representation of determining distance to an object/vehicle in front using lane width information, in accordance with an example embodiment of the present disclosure.

FIG. 2 is a representation 200 of an example automotive environment 100 for determining the distance from a vehicle (e.g. vehicle 104) to an object/vehicle (such as vehicle 204) in the direction of motion of the vehicle 104 using known lane width information stored in the memory 110, in accordance with an example embodiment of the present disclosure. In most of the countries the lane width (W) is fixed. For example, the lane width (W) as per the interstate highway standards for the U.S. Interstate Highway System is fixed and measures around 3.7 meters. The representation 200 depicts vehicle 104 on which the camera module 106 is installed (not shown in the figure) for the purpose of measuring the distance to the vehicle 204 in the direction of motion of the vehicle 104. The front camera 106a of the vehicle 104 captures the lane in one or more image frames to detect the lane markings 202.

In an embodiment, lane markings 202 on the lane can be detected using a number of computer vision methods/algorithms including, but not limited to, Hough transform for, line detection, deep learning based methods, etc. Once the lane markings 202 are detected, and assuming that the position of the front camera 106a relative to the vehicle 104 is static, virtual lane markings can be created and stored in the memory 110. In an embodiment, virtual lane markings can be overlaid on the detected lane markings 202 in the captured image frames.

The lane width is expressed in image coordinates (pixels). The fixed lane width in real world dimensions is known and available from various sources. As an example, a lane width of 60 pixels may be mapped into 3 meters in real world dimensions. The lane width information can be stored in a memory such as the memory 110. In an embodiment, the distance of any object (such as the vehicle 204) in front of the vehicle 104 can be obtained by a relation between a number of pixels capturing a lane width in the proximity of the object with a number of pixels corresponding to the known fixed lane width, and camera parameters of the front camera 106a. The camera parameter is the focal length of the front camera 106a. Accordingly, the determined lane width in pixels at the location of the object (such as the vehicle 204) is mapped to the fixed lane width in real world dimensions (e.g. meters) to determine the distance of the object (such as the vehicle 204) from the vehicle 104. In an embodiment, the mapping information may be predefined and stored in the memory 110.

In an embodiment, the vehicle 204 may be detected within the lane markings 202 in front of the vehicle 104. The object i.e. the vehicle 204 can be detected using a variety of computer vision algorithms and can be accurately located within the lane markings 202. Any object such as the vehicle 204 between the lane markings 202, in front of the vehicle 104, can be identified using methods such as by determining a spatial discontinuity of a surface of the lane in front of the vehicle 104. In the illustrated example, the vehicle 204 is shown to be detected in a box 206 within the lane markings 202. Given the fact that the vehicle 204 is known to be on the road, the distance to the bottom edge of the vehicle 204 is believed to be an accurate estimate of the distance to the vehicle 204 from the vehicle 104. Hence, the distance to the bottom edge of the vehicle 204 from the vehicle 104 is measured to determine the distance between the vehicles 104 and 204. Assuming that the lane width (in pixels) at the bottom edge of the object/vehicle is "w" pixels, the focal length of the camera(s) 106 is f (in pixels), and the, fixed lane width in real-world dimensions (e.g. meters) is W, the distance "D" of the object/vehicle from the vehicle 104 can be computed based on following expression:

$$D = f * (W/w) \qquad (1).$$

Once the lane markings 202 have been reliably estimated one time, for a fixed camera position, the distance from the vehicle 104 to any object/vehicle within the lanes can be estimated accurately.

It should be noted that the different kinds of road/highways may have different fixed lane/road widths. For example, interstate will have greater lane width compared to country roads. In an embodiment, the type of road/highways can be auto detected by the camera module 106, and thereafter the reference lane width (i.e. the fixed lane width) for expression (1) can be selected. In an embodiment, the, camera module 106 can detect a speed sign and make a judgment about the type of road to select the fixed lane width. For instance, a speed sign of "50" and above can be present only in interstates whereas a speed sign of "20" or so will be found only on residential roads. Other signboards, such as names of cities, road names, or positional information can also be used to, make a decision on the type of road/highway. Further, the maps data can have information about the kind of the road including its properties such as width in real world coordinates, Additionally, or optionally, the width of the lane marking 202 can also be used for determining distance of the vehicle 204 from the vehicle 104. For instance, using computer vision techniques, the width of the lane marking 202 (dashed, in FIG. 2) i.e. $w_m$ can be computed in image coordinates (pixels), and knowing the real world measurements of the lane making 202 (e.g., $W_m$ in meters), distance to any object in the same depth plane can be computed using analogous expressions of the expression (1), by substituting w by $w_m$ and W by $W_m$.

Figure 3:
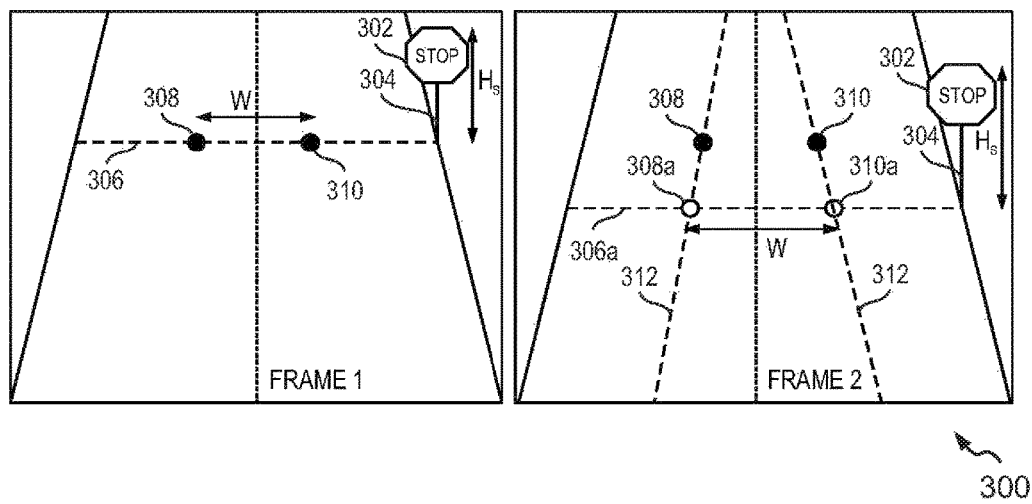
FIG. 3 is a representation of determining distance to of a vehicle to an object/vehicle in front using a known object in the scene where lane markings are not known, in accordance with an example embodiment of the present disclosure.

In scenarios where the lane markings are not available, the distance to the object/vehicle can be measured using a known object in the view of the camera module 106, which has been illustrated in FIG. 3.

FIG. 3 is a representation 300 for determining distance of any object from the vehicle (such as the vehicle 104) in the direction of motion of the vehicle using a known object in the scene, in accordance with an example embodiment of the present disclosure. On most roads/lanes, signs objects such as STOP signs, speed limit signs, traffic lights, etc., are available. These predefined objects have fixed and regulated dimensions, which are already known. The fixed and regulated dimensions of the predefined objects are stored in the memory 110. As the dimensions such as width, height, or length of the predefined object is known, a number of pixels associated with the predefined object in an image coordinate, can be used to measure any other distance in the image coordinate.

In FIG. 3, two frames image Frame 1 and image Frame 2 are captured by a front camera (such as the front camera 106a) at the front end of the vehicle 104 (not shown in FIG. 3) are illustrated. The image Frame 1 and the image Frame 2 correspond to a predefined object 302 ("STOP" sign 302 as shown in FIG. 3). The Frame 1 and the Frame 2 may be captured in a sequence at two different time instants. As an example, Frame 1 is captured at a time instant $t_n$, and Frame 2 is captured at a time instant $t_{n+1}$.

In the Frame 1 (left frame in FIG. 3) the STOP sign 302 is detected by using a computer vision algorithm. It is assumed that the STOP sign 302 is orthogonal to the road surface. Also, it is assumed that the front camera 106a is mounted in the vehicle 104 such that the front camera 106a is orthogonal to the road surface with the optical axis of the front camera 106a aligned in the direction of motion of the vehicle 104. As shown in FIG. 3, a stand 304 holds the STOP sign 302.

A first orthogonal line 306, from the base of the stand 304 holding the STOP sign 302 across the road is marked in the Frame 1. The first orthogonal line 306 is a virtual line and extends to the other side of the road cutting across the road. The stand 304 holding the STOP sign 302, and the first orthogonal line 306 are co-planar and it may be assumed that these are equidistant from the front camera 106a. It may be determined if the stand 304 is a straight line using a Hough Transform or other similar algorithms.

In an embodiment, as shown in Frame 1, at least a first pair of points for example virtual points 308, 310 are determined on the first orthogonal line 306 on either side from the center of the viewfinder of the front camera 106a at a first time instant. The virtual points 308, 310 are spaced at a fixed pre-determined distance to each other, i.e. separated by "w" pixels in the image coordinate. The number of pixels between the points 308, 310 may be determined based on a number of pixels associated with the STOP sign 302. It is noted that since a width of the STOP sign 302 is known, say 0.5 meter, a width of the lane on the road is also known, say 3.7 meter, it is deduced that the lane width is 7.4 times of the width of the STOP sign 302. Hence, if the STOP sign 302 occupies a 10 pixels of width in image coordinate of the camera 106, the lane width should be 74 pixels in the same frame. In this example, the two points 308, 310 are marked as separated by 74 pixels in the image coordinate.

In the Frame 2 of FIG. 3, the STOP sign 302 is closer to the vehicle 104 as the vehicle 104 is moving towards the STOP sign 302. The same process as above is repeated, i.e, from the base of the stand 306 a second orthogonal line i.e. a virtual line 306a same as the first orthogonal line 306 is determined from the base of the stand 304 holding the STOP sign 302 to across the road. Further, at least a second pair of points such as virtual points 308a, 310a are determined on the second orthogonal line 306a on either side from the center of the viewfinder of the front camera 106a at a second time instant. The points 308a, 310a are spaced apart by "w" pixels in image coordinates in the Frame 2, where w is determined based on, a number of pixels defining width of the STOP sign 302.

In an embodiment, a pair of lane markings 312 is determined by joining corresponding points of the first pair of points and the second pair of points. For example, two pairs of virtual points 308, 310, and 308a, 310a in the frames, Frame 1 and Frame 2 are joined (see dashes joining 308 and 308a and joining 310 and 310a). Joining the virtual points 308 and 308a and virtual points 310 and 310a in the two frames define a pair of lane markings 312 at a width w apart in the image coordinate. The pair of lane markings 312 provides the kale width (w) in pixels corresponding to different depths. Once the pair of lane markings 312 is defined, techniques described with reference to FIG. 2 can be used to determine distance of any object from the vehicle 104, wherein the object is detected within the lane marking 312. It shall be noted that the lane width (in image coordinate) can be determined using only one pair of virtual points (e.g. 308 and 310 or 308a and 310a) in one image frame. However, to define the virtual lane markings 312 at least two pairs of virtual points are required.

In an example scenario, distance estimation may not be accurate with the technique described with reference to FIG. 3, when the front camera 106a mounted on the vehicle 104 is not orthogonal to the road i.e. when the optical axis of the front camera 106a is not parallel to the direction of motion of the vehicle 104. In such a case, the view of the predefined object (e.g. the STOP sign 302) is warped because of which the lane markings and the lane width may not be determined properly leading to poor estimation of the distance between the vehicle 104 and any object/vehicle in the direction of motion of the vehicle 104. However, this issue can be resolved by utilizing the technique described with reference to FIG. 4.

Figure 4:
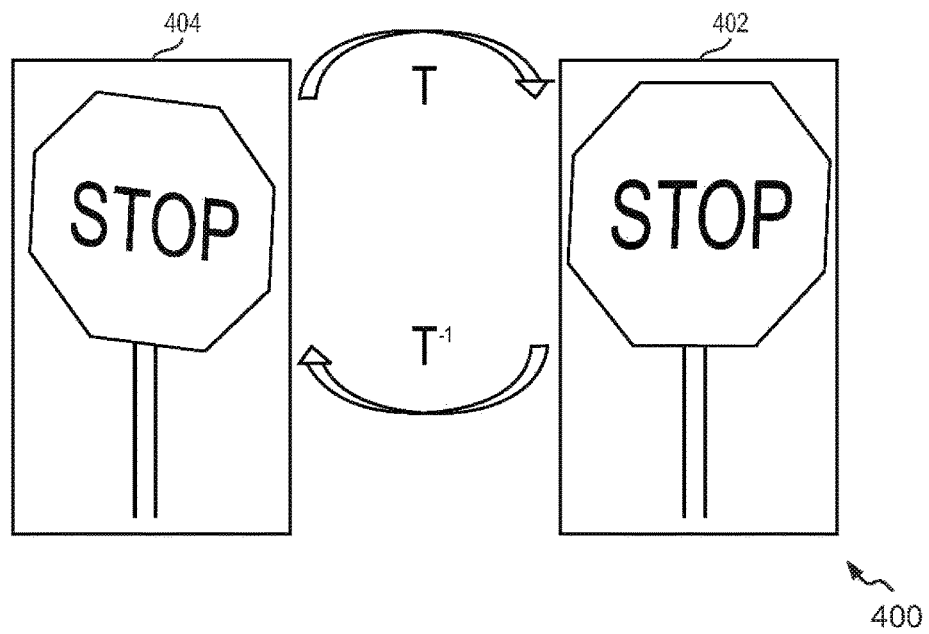
FIG. 4 is a representation of a scenario where the distance is estimated when a camera module mounted on the vehicle is not orthogonal to the road or when the known object is not orthogonal to the camera module, in accordance with an example, embodiment of the present disclosure.

FIG. 4 is a representation 400 of a scenario where the distance is estimated when a front camera (such as the front camera 106a) mounted on the vehicle (e.g. the vehicle 104 is not orthogonal to the road on which the vehicle 104 is moving, in accordance with an example embodiment of the present disclosure. The representation of FIG. 4 also illustrates a scenario when a known object on the road is not 'orthogonal' to the road/camera module 106. In an embodiment, templates or images of predefined, objects such as known sign objects, captured with a camera orthogonal to the surface of the road, are stored in the memory 110.

As an example, an image or a template 402 of a predefined object (e.g. STOP sign 302) captured with camera(s) orthogonal to the surface of the road, is already stored in the memory 110. Now assuming that the front camera (such as the front camera 106a) of the vehicle 104 is not orthogonal to the road, an image 404 of the STOP sign 302 is captured using the non-orthogonal front camera (such, as the front camera 106a). The image captured with the non-orthogonal camera module is matched against the template 402. Upon matching, a homograph transformation matrix "T" is determined, which can represent the deviation in pixels in the image 404 of the STOP sign 302 from the saved template 402. The homograph transformation matrix "T" may be determined in a number of ways, including, but not limited to, methods like feature point matching and the Random Sample Consensus (RANSAC) algorithm. Once the transformation matrix T has been found, the camera view may be transformed using the inverse $(T^{-1})$ of the homograph transform matrix "T", so that a view similar to that shown in FIG.

3 may be provided to a user driving the vehicle 104. Calculations similar to those described in FIG. 3 may be performed, and the sets of virtual points (308, 308a, 310 and 310a) in subsequent frames may be found for estimating the distance to an object/vehicle (such as vehicle 204) from the vehicle 104 when the lane information (lane markings) are not known.

There are multiple methods using which the mount of the camera module 106 with respect to the road can be determined. In an example scenario, the camera module 106 may not be mounted in a way such that the camera module 106 is orthogonal to the road but the camera module 106 has a yaw/pitch/roll. In another example scenario, the camera module 106 is mounted orthogonal to the road, but the predefined object such as the STOP sign 302 on the road has a pitch/roll/yaw.

To determine whether the camera module 106 is mounted orthogonal to the road, one or more inertial sensors (IMU) (see, inertial sensors 1124 in FIG. 11) can be used in an example embodiment. The for example an accelerometer, has 3 axes and if one of the axes is aligned with the direction of motion of the, vehicle (such as the vehicle 104 on which the camera module 106 is mounted), the IMU outputs can be used to infer whether the camera module 106 is mounted correctly. If the camera module 106 is mounted with a particular angle, then, when the vehicle 104 moves straight on a smooth surface, there will be significant energy in at least two dimensions of the accelerometer. If the camera module 106 is mounted correctly, then there should be significant energy in only one dimension of the accelerometer.

Another method for finding, out if the camera module 106 is mounted correctly is when road signs are detected by the camera module 106, it can be checked if a majority of predefined objects (such as the sign object 302) appear to have a pitch/roll/yaw with respect to the camera module 106. This is based on the assumption is that a majority of the predefined objects are mounted with no pitch/roll/yaw. Therefore, if a majority of the predefined object detected appear to have some transformation, then it can be inferred that the camera module 106 is not mounted orthogonal to the road. If the camera module 106 is, mounted correctly, and it is inferred that a predefined object, such as the traffic sign has a deformation, then, the dimensions in real world coordinates for the deformed predefined object can be computed (since the transformation will be known as described with reference to FIG. 4).

Additionally, alternatively or optionally, the orientation mount of the front camera (such as the front camera 106a) can be corrected, by giving feedback to a user to correct the orientation of the camera based on the homograph transformation matrix "T" or some other method. In an alternate embodiment, instead of defining virtual lane markings, a look up table is built which is populated with information about depth of known sign objects at different levels. As an example, horizontal pixels on a road corresponding to the place of the detected traffic sign are assigned a depth value or depth metric based on the pixel dimension of the traffic sign.

Figure 5:
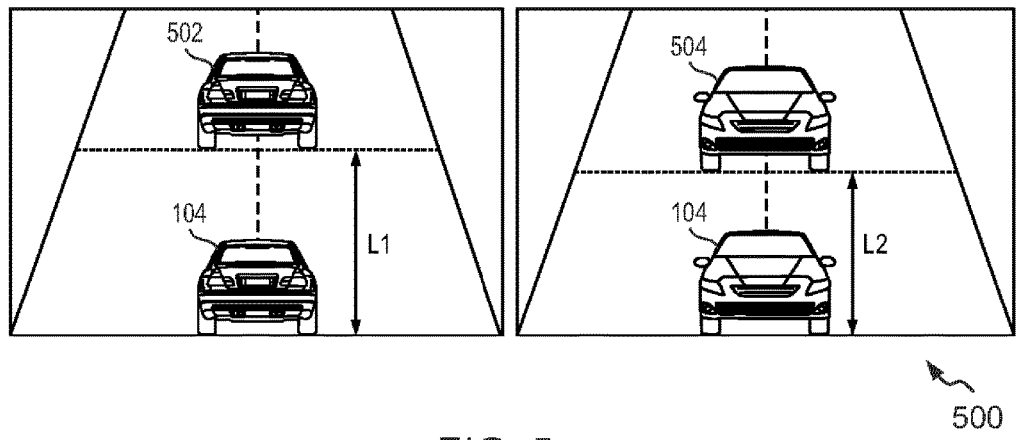
FIG. 5 is a representation of determining distance to an object/vehicle in front and at the back of the vehicle using a front camera and a rear camera of the vehicle respectively, in accordance, with an example embodiment of the present disclosure.

FIG. 5 is a representation 500 for determining distance from the vehicle 104 to objects or vehicles at the front and at the back of the vehicle 104 respectively, in accordance with an example embodiment of the present disclosure. As seen in FIG. 5, a vehicle 502 is at the front of the vehicle 104 and a vehicle 504 is behind the vehicle 104. The vehicle 502 is detected by a front camera (such as the front camera 106a) and the vehicle 504 is, detected by a rear camera (such as the rear camera 106b). Both of the front camera 106a and the rear camera 106b are monocular cameras.

As an example, a distance L1 separates the vehicle 104 and the vehicle 502 at the front. Similarly, a distance L2 separates the vehicle 104 and the vehicle 504 at the back. The distances L1 and L2 are determined using the methods explained with reference to either FIG. 2 or FIG. 3 depending upon the scenario.

Additionally, the velocity (V) of the vehicle 104 on which the front camera 106a and the rear camera 106b are installed is determined. Once the velocity is determined, safe braking distance for the vehicle 104 at the back is determined. In an example, the velocity (or speed) of the vehicle 104 may be known from a speedometer inside the vehicle 104. Further, the rate of change of distance ($\Delta d_2$) with time "t" for the vehicle 504 at the back is determined on a continuous basis, i.e. $\Delta d_2$ in time t. The rate of change of distance ($\Delta d_2$) of the vehicle at the back may be determined by estimating the distance of the vehicle 504 from the vehicle 104 using the expression (1) at various time instants. Subsequently, the rate of change of velocity ($\Delta V_2$) of the vehicle 504 is computed using the expression $\Delta V_2 = \Delta d_2 / \Delta t$.

In an, example embodiment, the TTC denoted as is then computed using the expression, $d_2/(V+\Delta V_2)$, where TTC or $t_c = d_2/(V+\Delta V_2)$. If the time to collision ($t_c$) is less than a predefined safe time, then indications/alerts are provided to the driver of the vehicle 104 through the display unit 112 and/or the audio output module 114. The driver of the vehicle 104 may be alerted and notified of the TTC, and the safe allowed distance for the vehicle 504 based on the current velocity of the vehicle 104. Example notifications can include information such as increasing distance between the vehicle 104 and the vehicle 502 or reducing the velocity of the vehicle 104 gradually when it is determined that the vehicle 504 at the back is not maintaining a safe distance with the vehicle 104. The notification can be displayed at the display unit 112. Additionally, notification can be provided through the audio output module 114 as audio feedbacks, Likewise, the process may be repeated for the vehicle 502 at the front of the vehicle 104 and a safe allowed distance may he maintained between the vehicle 104 and the vehicle 502. Another method of determining the TTC of the vehicle 104 with a vehicle in the front of the vehicle 104 is explained with reference with FIG. 8.

Alternatively or additionally, if the vehicle 504 and the vehicle 104 are equipped with vehicle to vehicle (V2V) technology, then the vehicle 104 can send a warning alert to the vehicle 504 (or to other surrounding vehicles) through vehicle to vehicle (V2V) technology. Similarly, if the vehicle 502 is also equipped with V2V technology, then the vehicle 104 can send a warning alert to the vehicle 502 through V2V technology.

Figure 6:
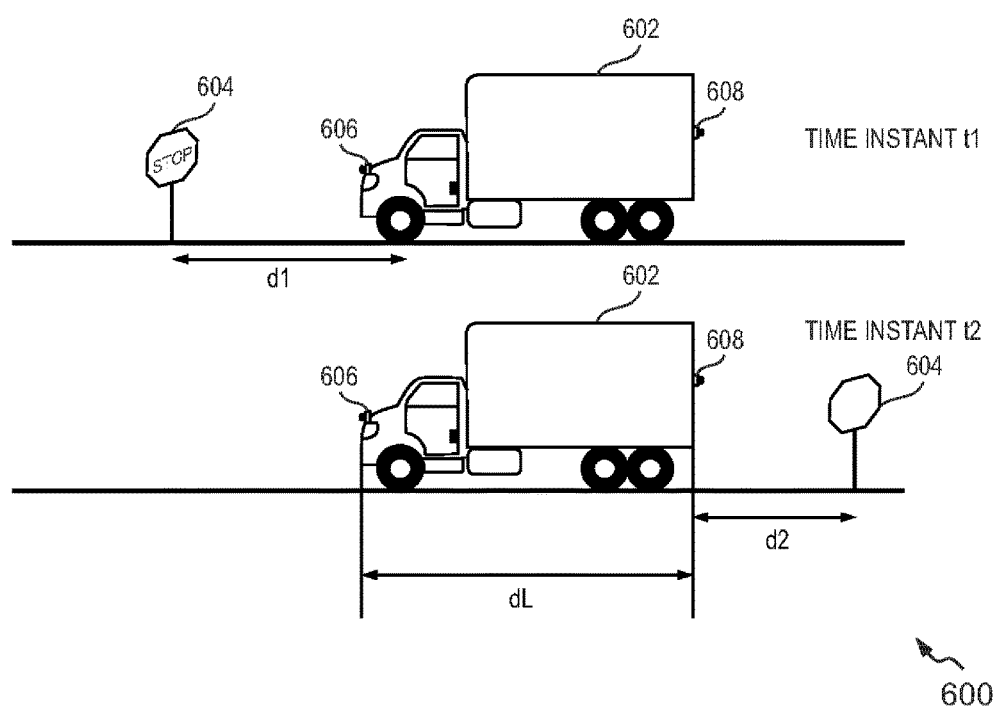
FIG. 6 is a representation of determining the length of a vehicle, in accordance with an example embodiment of the present disclosure.

FIG. 6 is a representation 600 for determining the length of a current vehicle, in accordance with an example embodiment of the present disclosure. A current vehicle 602 (such as the vehicle 104) and a reference object 604 (e.g. a STOP sign 302 in FIG. 3) are provided for illustrations. The length of the vehicle 602 may be determined for multiple use cases such as effective breaking distance for the vehicle 602. Further, the length of the vehicle 602 may be determined so as to localize the position of surrounding vehicles surrounding the vehicle 602 in case of Vehicle-to-everything (V2X) communication technology.

In the representation 600, at a time instant "t1", a front camera 606 (such as the front camera 106a) at the front end of the current vehicle 602 detects the reference object 604 and determines a distance "$d_1$" to the reference object 604 by using the expression (1) described in FIGS. 2-4. The image/video captured at the time instant t1, may correspond to a frame F1 as described with reference to FIG. 3. At a chronologically later, time instant "t2", the vehicle 602 has gone past the reference object 604. A rear camera 608 (such as the rear camera 106b) at the rear end of the vehicle 602 detects the reference object 604 and determines a distance "$d_2$" between the vehicle 602 and the reference object 604 by using the expression (1) described in FIGS. 2-4. The image/video captured at time instant t2, may correspond to a frame F2 as described with reference to FIG. 3.

As the reference object 604 i.e. a STOP sign 604 has a unique dimension, the front camera 606 detects a front view of the STOP sign 604 (such as the text "STOP") and the, rear camera 608 detects a back view of the STOP sign 604 (such as a white board). The distance between the vehicle 602 and the reference object 604 at the two time instances i.e. t1 and t2 are noted. The image captured in the frame F2 which displays the back view of the reference object 604 is known and is available from various sources. Once it is determined that the frames F1 and F2 correspond to the same reference object 604 in two different views, using the techniques mentioned above the depth or distance d1 between the front camera 606 and the reference object 604 and the distance d2 between the rear camera 608 and, the reference object 604 are determined.

Further, speed (S) of the vehicle 602 can be obtained from one of the various techniques. For example, the speed S of the vehicle 602 can be obtained using global positioning system (GPS), and/or in-car readings (speedometer) etc. Now, assuming that the speed S of the vehicle 602 when passing the reference object 604 is constant, the following expressions hold true:
With t2−t1=Δt, $$S = \frac{d1 + dL + d2}{t2 - t1} \quad (2)$$

$$dL = (S * \Delta t) - (d1 + d2) \quad (3)$$

Where dL is the length of the current vehicle 602. The estimate of dL can be refined by taking multiple readings.

Figure 7:
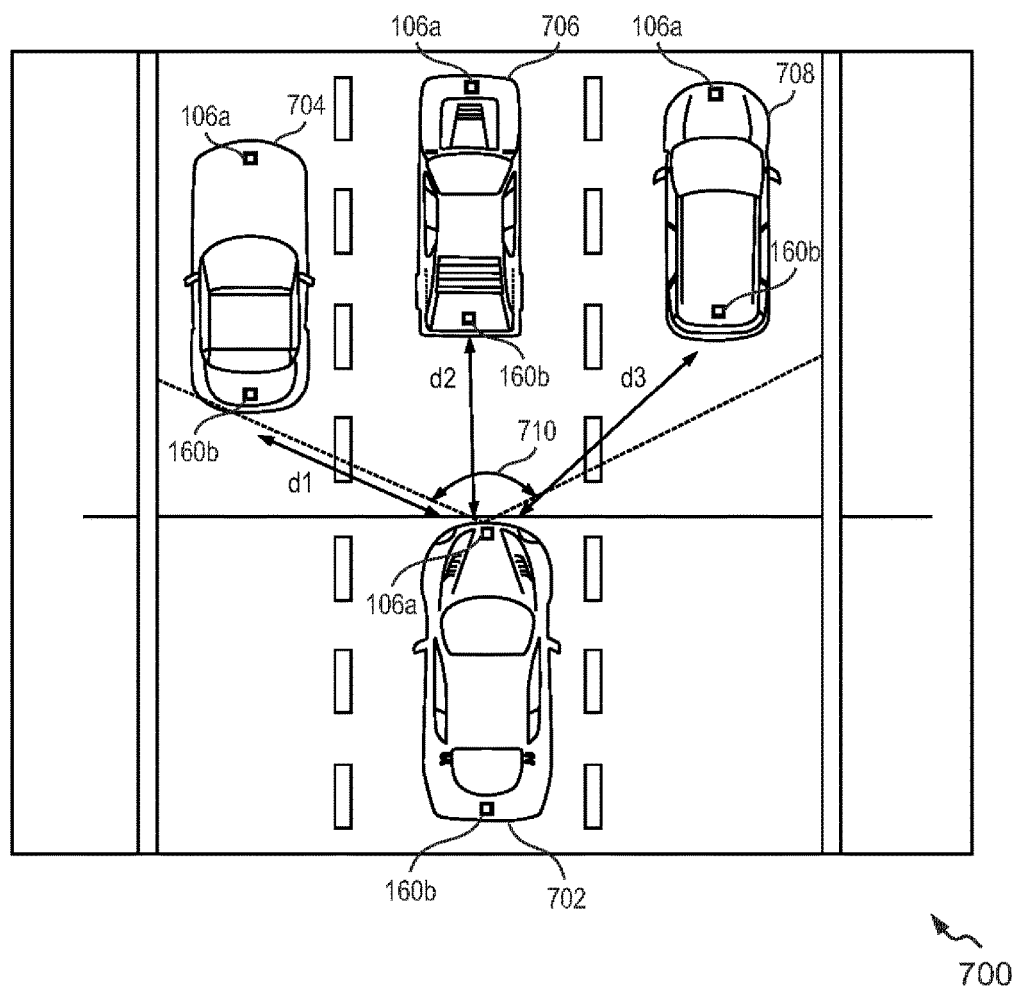
FIG. 7 is a representation of identifying vehicle positions for more accurate satellite signal based positioning using cameras, in accordance with an example embodiment of the present disclosure.

FIG. 7 is a representation 700 for identifying vehicle positions for more accurate satellite based positioning, such as, Global Positioning System (GPS) positioning using the camera module 106, in accordance with an example embodiment of the present disclosure. In FIG. 7, four (4) vehicles 702, 704, 706 and 708 are shown. The vehicles 702, 704, 706 and 708 are equipped with front and rear cameras (e.g. front camera 106a and rear camera 106b) and Vehicle-to-Everything (V2X) technology. The front camera 106a mounted on the vehicle 702 captures the scene of the road in the front which may include one or more vehicle (such as vehicles 704, 706 and 708) within field/angle of view (see 710) of the front camera 106a of the, vehicle 702. Using the techniques described with reference to FIG. 2 or FIG. 3, the distances of the vehicle 702 to the vehicles 704, 706 and 708 in front are determined using the expression (1). As can be seen in FIG. 7, the distances of vehicle 702 from the vehicles 704, 706 and 708 are d1, d2 and d3 respectively. In a vehicle-to-vehicle (V2V) communication;scenario, all vehicles on a road communicate with one another.

During a vehicle-to-vehicle (V2V) communication between two vehicles, say vehicles 702 and 704, the vehicle 704 sends some information to the vehicle 702. The information may be associated with the vehicle 704 and may include make and color of the vehicle, license plate information etc. The vehicle 702 may correlate the information with an external database of vehicles and fetch a reference image of the vehicle 704. Once a match is found, the relative position of the vehicle 704 with respect to the vehicle 702 is obtained. The matching can also be done using license plate detection. Similarly, the vehicle 704 may verify the position of the vehicle 702 using the rear camera 106b of the vehicle 704. The relative positions thus computed can be very useful in correcting locational (GPS) errors or propagating correct location coordinates of vehicles.

Additionally, the composite system 102 of a vehicle such as the vehicle 104 may be configured to check yield sign compliance by a driver of the vehicle 104. Herein, yield sign is usually present where a side road joins a main road. It is imperative for the vehicle joining the main road from the side road to make way for approaching vehicles in the main road. Yield compliance can be detected using the front and the rear camera of the vehicle 104. As an example, a rear camera (such as the rear camera 106b) detects the vehicles at the back of the current vehicle at time instant t1. A yield sign is detected by a front camera (such as the front camera 106a) of the vehicle 104 in the direction of motion of the vehicle 104 at a time instant t2. At the time instant t2, the rear camera checks for the vehicle at the back. If the detected vehicle at the back at the time instant t2 is the same as the one detected by the rear camera at a time instant t1, before the yield sign was detected, it is determined that the vehicle 104 has not violated yield sign compliance. However, if the vehicle at the back at the time instant t2 is a different one than the one detected at time instant t1, and if the vehicle at the back is approaching at a high speed and decelerating suddenly then it clearly indicates that the driver of the vehicle 104 didn't yield to the approaching vehicle i.e. yield compliance is not followed.

Figure 8:
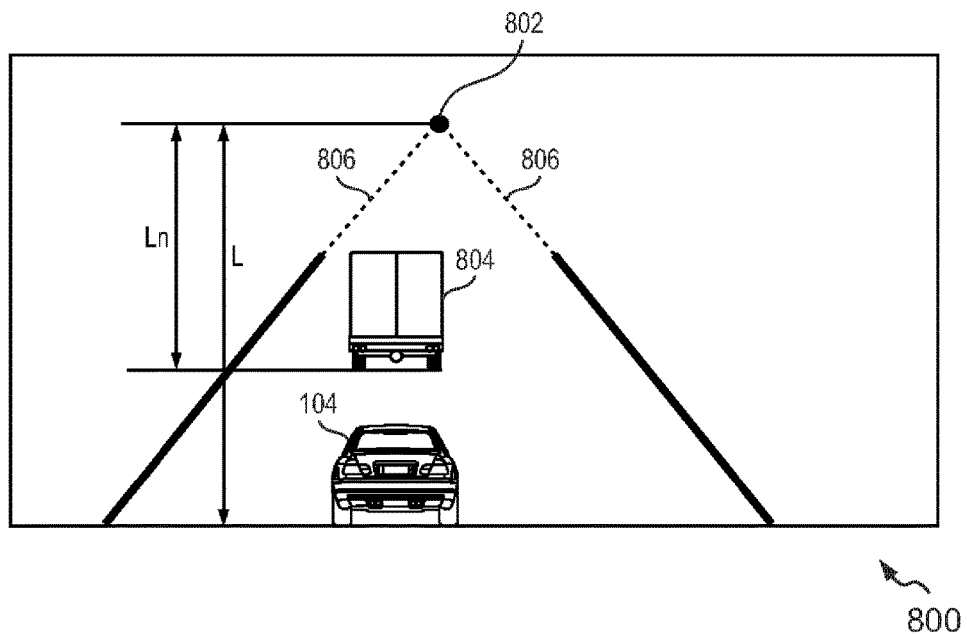
FIG. 8 is a representation of determining, time to collision (TTC) using vanishing point associated with lane markings, in accordance with an example embodiment of the present disclosure.

The composite system 102 of the present disclosure further estimates a TTC with a vehicle (such as vehicle 204 of FIG. 2, vehicle 502 of FIG. 5 and vehicle 804 of FIG. 8) at the front of a vehicle (such as the vehicle 104) in the image frames captured by the front camera 106a of the vehicle 104. FIG. 8 is a representation 800 for computing the TTC using a vanishing point 802, in accordance with an example embodiment of the present disclosure. The vanishing point 802 is determined by extending the lane markings (e.g. lane markings 202 and lane markings 312) and locating the points where the lane markings intersect. The distance that is maintained between the vehicles and the actual and relative velocity between the vehicles is used for the purpose of computation of TTC.

As can be seen in FIG. 8, lane markings 806 are detected in the scene using a lane detection algorithm or using techniques explained with reference to FIG. 2 and FIG. 3. The front camera (e.g. front camera 106a) of the vehicle 104 detects other vehicles (such as vehicle 804) in the front. Distance of the vanishing point 802 to the bottom location of the vehicle 804 is determined in image coordinates. For example, the front camera captures an image frame "n" where, the distance of the vanishing point 802 to the bottom location of the vehicle 804 is detected in the image coordinates. The determined distance is denoted as $L_n$. Similarly, assuming that for a previous image frame "n−1" captured by the front camera, the distance of the vanishing point 802 to the bottom location of the vehicle 804 is $L_{n+1}$. The TTC with the vehicle 804 is calculated by following expression:

$$TTC = \frac{1}{\left(1 - \left(\frac{L_n}{L_{n-1}}\right)\right)} * \Delta t \quad (4)$$

where is the distance between the vanishing point 802 and the vehicle 804 as detected in the image frame "n", and $L_{n-1}$ is the distance between vanishing point 802 and vehicle 804 in a previous frame "n−1". In the expression (4), "Δt" is time difference between the two frames. The distance is in image coordinates (pixel). The above expression is derived based on following expressions:

$$TTC = \frac{\text{Distance to the vehicle in front}}{\text{Velocity of the current vehicle}} \quad (5)$$

$$TTC = \frac{D_n}{V_n}$$

where $D_n$ is the distance from the vehicle 104 to the vehicle 804 in front and $V_n$ is the velocity of the vehicle 104. Velocity of the vehicle 104 can be deduced from following expression:

$$V_n = \frac{D_n - D_{n-1}}{t_n - t_{n-1}} \quad (6)$$

where $D_n$ is a distance to the vehicle 804 in front for the $n^{th}$ frame and $D_{n-1}$ is the distance to the vehicle 804 in front during the $(n-1)^{th}$ frame. $t_n$ is the time instant at which the $n^{th}$ frame is captured and $t_{n-1}$ is the time instant at which the $(n-1)^{th}$ frame is captured.

$$\text{Thus, } TTC = \frac{Dn}{\frac{D_n - D_{n-1}}{t_n - t_{n-1}}} \quad (7)$$

$$\text{i.e. } TTC = \frac{Dn}{D_n - D_{n-1}} * \Delta t \quad (8)$$

where $\Delta t = t_n - t_{n-1}$

Now, in the image space of the front camera, the following expression holds true $$D_n \propto \frac{\alpha}{L_n} \quad (9)$$

Where α is a constant determined by camera parameters (focal length and height of the camera mounting). Since the formula for TTC is based on acceleration between the vehicle 104 and the vehicle 804 at the front, it does not give accurate TTC when two vehicles on the road are maintaining equal distance from each other. The following expression can be used for the purpose of detecting this kind of a use case:

$$\text{Ratio} = \frac{L_n}{L} * \frac{S_v}{S} \quad (10)$$

where L is the distance in image coordinates from the vanishing point 802 to the bottom of the vehicle 104. $S_v$ is the instantaneous speed of the vehicle 104 and S is a constant, which denotes a higher speed number, for example, 80 mph for the US region. The above expression (10) is threshold to detected instants of tailgating at high speeds with relative velocity remaining almost constant between the vehicles.

Figure 9:
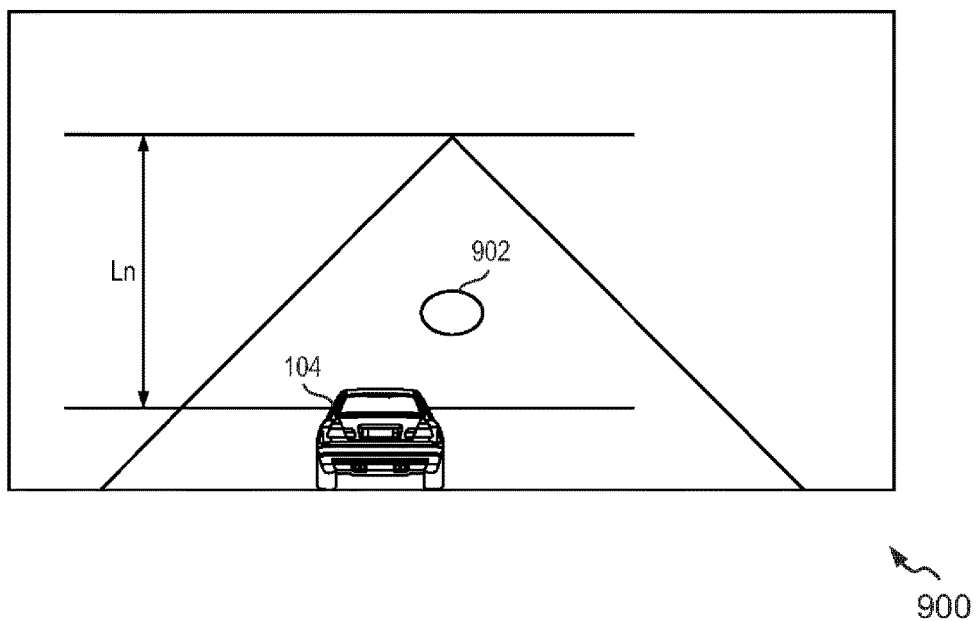
FIG. 9 illustrates a representation of determining TTC to an anomalous object on the road, in accordance with an example embodiment of the present disclosure.

FIG. 9 is a representation 900 for computing TIC to an anomalous object on the road, in accordance with an example embodiment of the present disclosure. It is important to warn the driver of any vehicle of objects that are not normally expected on the road, as the driver tend to miss seeing the anomalous object. Examples include a rock, an animal, an animal carcass, auto debris, potholes, oil spills, etc.

In this embodiment, road surface is detected using an algorithm, and the anomalous object such as the object 902 is a spatial discontinuity in the surface of the road. For example, debris on the road will be different in appearance and texture from the road, and thus can be detected. Spatial segmentation algorithm can be used to detect the road, and separate out the debris. Thereafter, it is detected that whether the anomalous object 902 is surrounded on all sides by the, road or is surrounded at least on two sides by the road. If any of these conditions are satisfied, it is confirmed that the anomalous object 902 is present on the road. The distance from the vehicle 104 to the anomalous object 902 can be determined using techniques described in reference to FIG. 2 using the expression of (1).

Alternatively, distance to the anomalous object 902 can be determined using techniques described in reference to FIG. 8 that uses the vanishing point based method. It is to be noted that the method in FIG. 8 does not use, object recognition. It shall be noted that, surface of the road in practice is very homogeneous, and as such, it, is possible to detect any object that disrupts the homogeneity.

Figure 10:
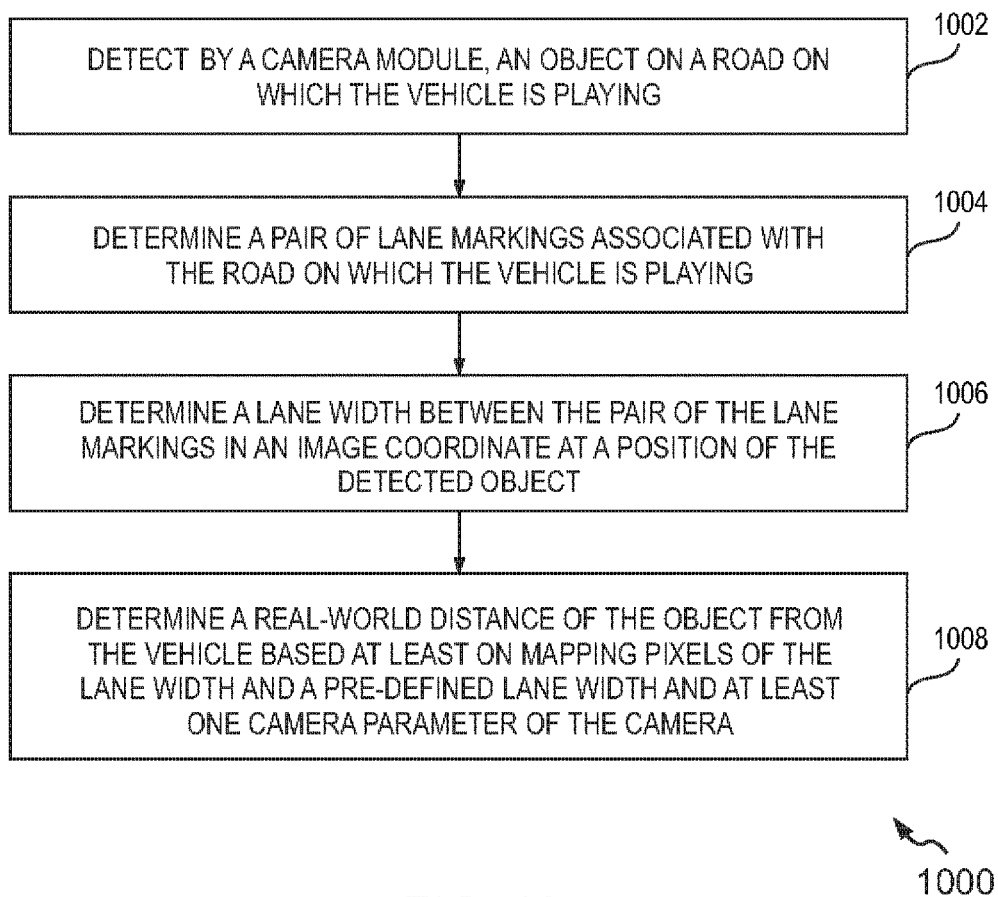
FIG. 10 is a flowchart illustrating a method for estimating distance of an object from a vehicle.

FIG. 10 is a flowchart illustrating a method 1000 for estimating distance of an object or a vehicle from a vehicle such as the vehicle 104. In an embodiment, the method 1000 is carried out by the processor 108 of the composite system 102 and includes a plurality of steps or operations. The sequence of operations of the method 1000 may not be necessarily executed in the same order as they are presented. Further, one or more steps may be grouped together and performed in form of a single step, or one step may have several sub-steps that may be performed in parallel or in sequential manner.

At operation 1002, the camera module 106 detects an object, on a road on which the vehicle is moving. Object detection can be performed using one or more object detection algorithms. The algorithm for, object detection identifies spatial discontinuity on the surface of the road and thereby detects the presence of an object on the road on which the vehicle is moving. The front camera 106a detects an object at the front of the vehicle and the rear camera 106b detects an object at the back of the vehicle. The object can be another vehicle or anomalous objects on the road.

At operation 1004, the camera module 106 determines a pair of lane markings associated with the road on which the vehicle is moving. The pair of lane markings (see 202, 312, 806) is detected from the image frames of the road/lane captured using the camera module 106. Once the pair of lane markings is detected, the lane width is determined in image coordinates (pixels). In an example scenario, the lane width is known.

In an example, where the lane width is not known, the method 1000 include detecting at least one known sign object on the lane, such as a STOP sign, traffic lights, etc., in at least two image frames. The method 1000 then includes creating virtual lane markings, as explained with reference to FIG. 3.

At operation 1006 a lane width is determined between the pair of the lane markings in an image coordinate (pixels) at a location of the detected object. The lane width is denoted in pixels. A mapping between the pixel and the real world dimension, such as meter, is stored in the memory. The mapping/relationship between the two quantities is used to determine the distance from the vehicle to the detected object. The position of the object may include a bottom edge or a center of the object.

At operation 1008, real-world distance of the object from the vehicle is determined based at least on number of pixels of the lane width and a pre-defined lane width in image coordinate and at least one camera parameter of the camera module. The at least one camera parameter is the focal length (f) of the front camera 106a and/or the rear camera 106b. Using the relation, $D=f*(W/w)$, the distance is determined. In the relation, D is the distance, f is the focal length of the camera (106) in pixels, w is the lane width (in pixels) at the position of the object/vehicle and W is the fixed lane width in real-world dimensions (e.g. 3.7 meters).

Figure 11:
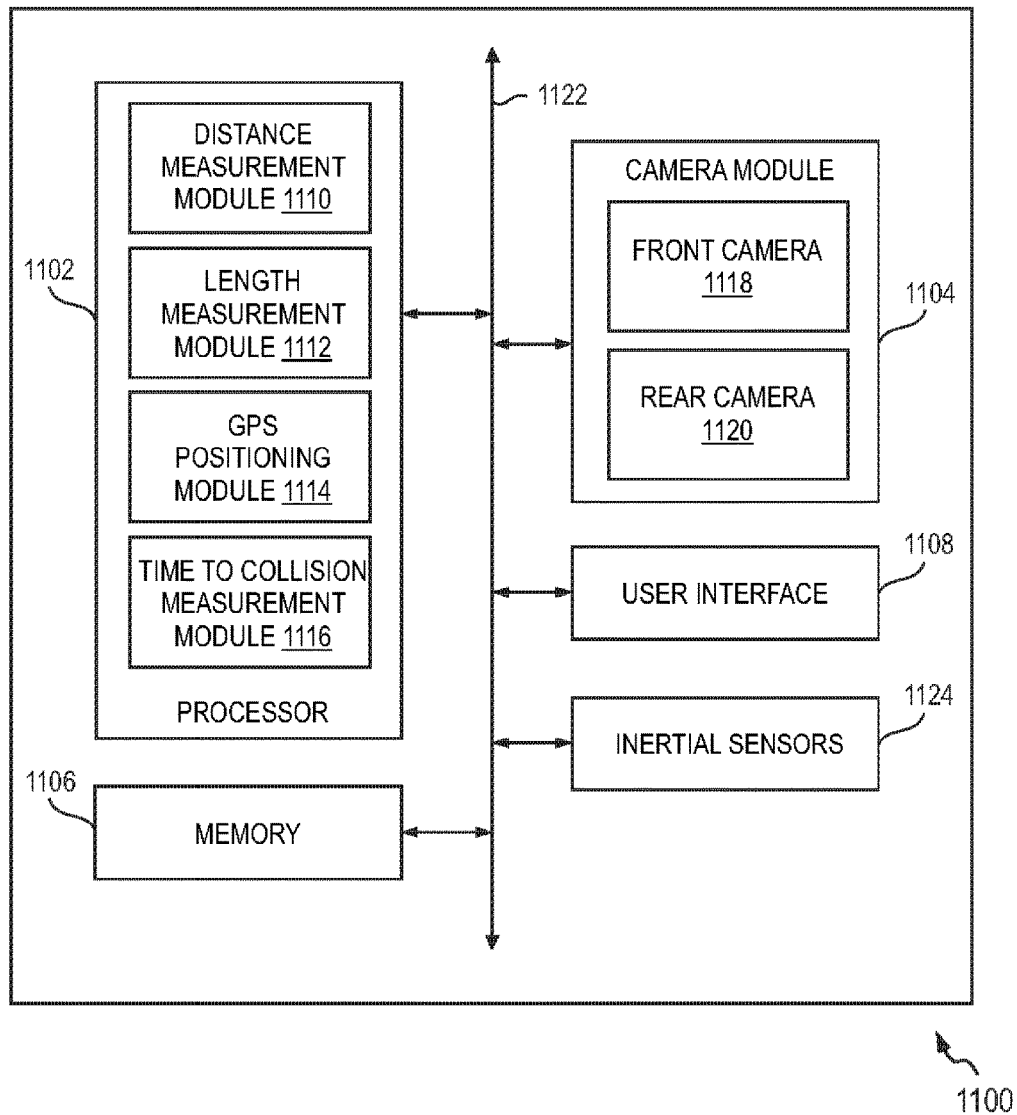
FIG. 11 is a block diagram of a system for estimating distance of an object from a vehicle, in accordance with an example embodiment.

FIG. 11 is a simplified block diagram of a system 1100 configured to estimate the distance from a moving vehicle, in accordance with an example embodiment. The system 1100 may be employed, for example, in the vehicle of a user. It should be noted that the devices or elements described below may not be mandatory and thus some may be omitted in certain embodiments. The system 1100 includes or otherwise is in communication with at least one processor 1102 and at least one memory 1106. The system 1100 also includes a camera module 1104 which includes at least one of a front, camera 1118 and a rear camera 1120. The system 1100 also includes inertial sensors 1124 for measuring orientation of the camera module 1104. Examples of the inertial sensors 1124 includes accelerometer, gyroscope or any such sensor that can measure orientation (e.g., detection of whether cameras are orthogonal to the road or not) of the front camera 1118 and/or the rear camera 1120.

Examples of the at least one memory 1106 include, but are not limited to, volatile and/or non-volatile memories. Some examples of the volatile memory include, but are not limited to, random access memory, dynamic random-access memory, static random-access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 1106 may be configured to store information, data, applications, instructions or the like for enabling the system 1100 to carry out various functions in accordance with various example embodiments. For example, the memory 1106 may be configured to store contextual data and multi-sensor data for processing by the processor 1102. Additionally, or alternatively, the memory 1106 may be configured to store, instructions for execution by the processor 1102.

A user interface 1108 may be in communication with the processor 1102. Examples of the user interface 1108 include, but are not limited to, input interface and/or output interface. The input interface is configured to receive an indication of a user input. The output interface provides an audible, visual, mechanical or other output and/or feedback to the user. Examples of the input interface may include, but are not limited to, a keyboard, a mouse, a joystick, a keypad, a touch screen, soft keys, a microphone, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In one embodiment, the user interface 1108 may be used to view the various alerts/notifications generated while the user is operating the vehicle. The processor 1102 may be embodied in a number of different ways.

The processor 1102 may be embodied as a multi-core processor, a single core processor; or combination of multicore processors and single core processors. For example, the processor 1102 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special purpose computer chip, or the like.

In an example embodiment, the multi-core processor may be configured to execute instructions stored in the memory 1106 or otherwise accessible to the processor 1102. Alternatively or additionally, the processor 1102 may be configured to execute hard coded functionality. As such, whether configured by hardware or software methods, or by a combination thereof, the processor 1102 may represent an entity, for example, physically embodied in circuitry, capable of performing operations according to various embodiments while configured accordingly. For example, if the processor 1102 is embodied as two or more of an ASIC, FPGA or the like, the processor 1102 may be specifically configured hardware for conducting the operations described herein. Alternatively, as another example, if the processor 1102 is embodied as an executor of software instructions, the instructions may specifically configure the processor 1102 to perform the algorithms and/or operations described herein when the instructions are executed. However, in some cases, the processor 1102 may be a processor of a specific device, for example, a mobile terminal or network device adapted for employing embodiments by further configuration of the processor 1102 by instructions for performing the algorithms and/or operations described herein. The processor 1102 may include, among other things, a clock, an arithmetic logic unit (ALU) and logic gates configured to support operation of the processor 1102.

The processor 1102 also includes several modules such as a distance measurement module 1110, a length measurement module 1112, GPS positioning module 1114 and a time to collision (TTC) measurement module 1116 The distance measurement module 1110 is used for determining distance to the object/vehicle using lane width information/using the known object in the scene and by using the information from a front camera 1118 and a rear camera 1120. The length measurement module 1112 is used for determining the length of the vehicle (e.g. vehicle 104) using the front camera 1118 and the rear camera 1120, in order to maintain a safe driving distance. The GPS positioning module 1114 is used, for getting the accurate GPS location of the vehicle for the purpose of avoiding the collisions. The time to collision (TTC) measurement module is used to find the safe distance between the vehicles or between the vehicle and the anomalous object, in order to avoid collision.

The embodiments disclosed herein, provide numerous advantages. The systems and methods disclosed herein enable the real time distance estimation from a moving vehicle using a monocular camera. Measurement of the distance of other objects on the road from the vehicle is of critical importance from the perspective of Automated-Driver-Assistance-Systems (ADAS), which helps to avoid accidents and also ensure safe driving. In the embodiments of the present invention, using a single dash mounted camera, the distance to, other objects on the road can be measured accurately in real-time.

The present disclosure is described above with reference to block diagrams and flowchart illustrations of method, and system embodying the present disclosure. It will be understood that various block of the block diagram and flowchart illustrations, and combinations of blocks in the block diagrams and flowchart illustrations, respectively, may be implemented by a set of computer, program instructions. These set of instructions may be loaded onto a general purpose computer, special purpose computer, or other programmable data, processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a system described and depicted in FIG. 11. A computer-readable medium may comprise a computer-readable storage medium that may be any media or means that can contain or store the instructions for use by or in connection, with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application \or implementation without departing from the spirit or scope of the claims.

What is claimed is:

1. A method, comprising:
    detecting, by a camera module in one or more image frames, an object on a road on which a vehicle is moving;
    electronically determining a pair of lane markings associated with the road;
    electronically determining a lane width between the pair of lane markings in an image coordinate of the one or more image frames, the lane width determined at a location of the object on the road; and
    electronically determining a real-world distance of the object from the vehicle based at least on:
        a number of pixels corresponding to the lane width in the image coordinate,
        a pre-defined lane width associated with the road, and
        at least one camera parameter of the camera module.

2. The method as claimed in claim 1, wherein electronically determining the pair of lane markings comprises:
    detecting, by the camera module, a predefined object above the road or on a side of the road;
    determining, at a first time instant of detection of the predefined object, at least a first pair of points in the image coordinate, spaced at a pre-determined distance to each other, on a first orthogonal line from a base of the predefined object to across the road;
    determining, at a second time instant of detection of the predefined object, at least a second pair of points in the image coordinate, spaced at the pre-determined distance to each other, on a second orthogonal line from the base of the predefined object to across the road; and
    defining the pair of lane markings based on joining corresponding points of the first pair of points and the second pair of points.

3. The method as claimed in claim 2, wherein when the camera module is orthogonal to the road, determining at least the first pair of points and determining at least the second pair of points comprise determining the pre-determined distance in the image coordinate based on a number of pixels associated with the predefined object in the image coordinate.

4. The method as claimed in claim 2, wherein when the camera module is not orthogonal to the road, determining at least the first pair of points and determining at least the second pair of points comprise:
    comparing an image of the predefined object with a template image of the predefined object to determine a transformation matrix; and
    determining the pre-determined distance in the image coordinate based at least on the transformation matrix and a number of pixels associated with the predefined object in the image coordinate.

5. The method as claimed in claim 3, wherein when the camera module is not orthogonal to the road, determining at least the first pair of points and determining at least the second pair of points comprise:
    comparing an image of the predefined object with a template image of the predefined object to determine a transformation matrix; and
    facilitating correction in orientation of the camera module to make the camera module orthogonal to the road based on the transformation matrix.

6. The method as claimed in claim 2, wherein the camera module is a front camera mounted on a front side of the vehicle and the object is a front vehicle, and wherein the method further comprises:

calculating a velocity of the vehicle; and
calculating a safe braking distance of the vehicle for the front vehicle based on the real-world distance of the front vehicle from the vehicle and the velocity of the vehicle.

7. The method as claimed in claim 2, wherein the camera module is a rear camera mounted on a rear side of the vehicle and the object is a rear vehicle, and wherein the method further comprises:
calculating a velocity of the vehicle; and
calculating a safe braking distance of the vehicle for the rear vehicle based on the real-world distance of the rear vehicle from the vehicle and the velocity of the vehicle.

8. The method as claimed in claim 2, wherein the camera module comprises a front camera mounted on a front side of the vehicle and a rear camera mounted on a rear side of the vehicle, and wherein the method further comprises:
calculating a distance of the predefined object from the front camera at a time instant t1;
calculating a distance of the predefined object from the rear camera at a time instant t2, the time instant t2 chronologically later than the time instant t1; and
calculating a length of the vehicle based at least on:
the distance of the predefined object from the front camera;
the distance of the predefined object from the rear camera; and
a current speed of the vehicle.

9. The method as claimed in claim 2, further comprising correcting a location information of the vehicle obtained from a satellite signal receiver, based on the distance of the vehicle determined from the object.

10. The method as claimed in claim 1, wherein the object is a front vehicle, and the method further comprises:
determining a vanishing point associated with the pair of lane markings; and
determining a time to collision with the front vehicle based on positioning of each of the vehicle and the front vehicle with respect to the vanishing point in the image coordinate.

11. The method as claimed in claim 1, wherein the object is an anomalous object on the road, and the method further comprises:
detecting the anomalous object based on road discontinuity in the one or more image frames captured by the camera module;
determining a vanishing point associated with the pair of lane markings; and
determining a time to collision with the anomalous object based on positioning of each of the vehicle and the anomalous object with respect to the vanishing point in the image coordinate.

12. The method as claimed in claim 1, wherein the object is an approaching vehicle on a main road when the vehicle joins from a side road to the main road, and wherein the method further comprises:
checking for a yield sign; and
detecting for a yield compliance followed by the vehicle based on determining a distance of the approaching vehicle from a rear portion of the vehicle.

13. The method as claimed in claim 1, further comprising identifying surrounding vehicles of the vehicle in the one or more image frames using a Vehicle to Vehicle (V2V) communication.

14. A system, comprising:
a camera module configured to:
capture one or more image frames of a road on which a vehicle is moving; and
a memory configured to:
store the one or more image frames;
store image processing instructions; and
a processor configured to execute the image processing instructions on the one or more image frames and cause the system to at least:
detect, in the one or more image frames, an object on the road;
determine a pair of lane markings associated with the road;
determine a lane width between the pair of lane markings in an image coordinate of the one or more image frames, the lane width determined at a location of the object on the road; and
determine a real-world distance of the object from the vehicle based at least on a number of pixels corresponding to the lane width in the image coordinate, a pre-defined lane width associated with the road and at least one camera parameter of the camera module.

15. The system as claimed in claim 14, wherein to determine the pair of lane markings associated with the road, the system is further caused to at least:
detect a predefined object above the road or on a side of the road;
determine at a first time instant of detection of the predefined object, at least a first pair of points in the image coordinate, spaced at a pre-determined distance to each other, on a first orthogonal line from a base of the predefined object to across the road;
determine at a second time instant of detection of the predefined object, at least a second pair of points in the image coordinate, spaced at the pre-determined distance to each other, on a second orthogonal line from the base of the predefined object to across the road; and
define the pair of lane markings based on joining corresponding points of the first pair of points and the second pair of points.

16. The system as claimed in claim 15, wherein the camera module comprises a front camera mounted on a front side of the vehicle and a rear camera mounted on a rear side of the vehicle, and wherein the system is further caused to at least:
calculate a distance of the predefined object from the front camera at a time instant t1;
calculate a distance of the predefined object from the rear camera at a time instant t2, the time instant t2 chronologically later than the time instant t1; and
calculate a length of the vehicle based at least on:
the distance of the predefined object from the front camera;
the distance of the predefined object from the rear camera; and
a current speed of the vehicle.

17. The system as claimed in claim 15, wherein if the camera module is not orthogonal to the road, the system is further caused to at least:
compare an image of the predefined object, captured by the camera module not orthogonal to the road, with a template image of the predefined object stored in the memory to determine a transformation matrix; and
facilitate correction in orientation of the camera module to make the camera module orthogonal to the road based on the transformation matrix.

18. The system as claimed in claim 15, further comprising one or more inertial sensors to determine if the camera module is orthogonal to the road.

19. The system as claimed in claim 15, wherein the system is further caused to at least:
- calculate a velocity of the vehicle; and
- calculate a safe braking distance of the vehicle for the object based on the real-world distance of the object from the vehicle and the velocity of the vehicle.

20. The system as claimed in claim 15, wherein the system is further caused to at least:
- determine a vanishing point associated with the pair of lane markings; and
- determine a time to collision with the object on the road based on positioning of each of the vehicle and the object with respect to the vanishing point in the image coordinate.

\* \* \* \* \*